US012360826B2

(12) United States Patent
Rodriguez Sierra et al.

(10) Patent No.: US 12,360,826 B2
(45) Date of Patent: *Jul. 15, 2025

(54) FLEXIBLE AND SCALABLE ARTIFICIAL INTELLIGENCE AND ANALYTICS PLATFORM WITH FLEXIBLE CONTENT STORAGE AND RETRIEVAL

(71) Applicant: OPEN TEXT SA ULC, Halifax (CA)

(72) Inventors: Marc Rodriguez Sierra, Sant Just Desvern (ES); Lalith Subramanian, San Mateo, CA (US); Carles Bayes Martin, Sant Just Desvern (ES)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,141

(22) Filed: May 15, 2024

(65) Prior Publication Data

US 2024/0303137 A1    Sep. 12, 2024

Related U.S. Application Data

(63) Continuation of application No. 18/191,992, filed on Mar. 29, 2023, now Pat. No. 12,020,087, which is a
(Continued)

(51) Int. Cl.
*G06F 9/54*      (2006.01)
*G06F 16/22*   (2019.01)
(Continued)

(52) U.S. Cl.
CPC ............ *G06F 9/541* (2013.01); *G06F 16/221* (2019.01); *G06F 16/2456* (2019.01);
(Continued)

(58) Field of Classification Search
CPC ........ G06F 9/541; G06F 9/547; G06F 16/221; G06F 16/2456; G06F 16/252; G06F 16/27

See application file for complete search history.

(56) References Cited

U.S. PATENT DOCUMENTS 11,023,293 B2 *  6/2021  Rodriguez Sierra . G06F 16/254
11,650,861 B2 *  5/2023  Rodriguez Sierra . G06F 16/383
                                                                719/328

(Continued)

*Primary Examiner* — Brian W Wathen
(74) *Attorney, Agent, or Firm* — Sprinkle IP Law Group

(57) ABSTRACT

Systems and methods for content management wherein a client can submit requests to a first API which the forwards the requests to either an IMDB or a gateway to a distributed cluster-computing framework. Requests to the IMDB are serviced and responses from the IMDB are returned to the client. Requests that are forwarded to the gateway are first modified for the distributed cluster-computing framework, and are then parsed by the gateway and used to instantiate processors that generate corresponding requests to the distributed cluster-computing framework. Responsive data from the distributed cluster-computing framework is used to generate responses to the client requests that are forwarded to the first API which modifies them to appear as if they were generated by the IMDB. These modified responses are returned by the first API to the client.

20 Claims, 5 Drawing Sheets

Related U.S. Application Data continuation of application No. 17/324,200, filed on May 19, 2021, now Pat. No. 11,650,861, which is a continuation of application No. 16/295,379, filed on Mar. 7, 2019, now Pat. No. 11,023,293.

(60) Provisional application No. 62/639,899, filed on Mar. 7, 2018.

(51) Int. Cl.
*G06F 16/2455* (2019.01)
*G06F 16/25* (2019.01)
*G06F 16/27* (2019.01)
*G06F 16/84* (2019.01)
*G06N 5/04* (2023.01)

(52) U.S. Cl.
CPC ............ *G06F 16/252* (2019.01); *G06F 16/27* (2019.01); *G06F 16/84* (2019.01); *G06N 5/04* (2013.01)

(56) References Cited

U.S. PATENT DOCUMENTS

| | | | |
|---|---|---|---|
| 12,020,087 B2 * | 6/2024 | Rodriguez Sierra | G06F 16/2456 |
| 2010/0169351 A1 * | 7/2010 | Kulkarni | G06F 16/248 707/E17.014 |
| 2010/0174696 A1 * | 7/2010 | Dixon | G06F 16/16 719/314 |
| 2018/0060362 A1 * | 3/2018 | Chidambaran | G06F 16/2282 |

* cited by examiner

FLEXIBLE AND SCALABLE ARTIFICIAL INTELLIGENCE AND ANALYTICS PLATFORM WITH FLEXIBLE CONTENT STORAGE AND RETRIEVAL

CROSS-REFERENCE TO RELATED APPLICATION(S)

This application is a continuation of, and claims a benefit of priority under 35 U.S.C. 120 from, Ser. No. 18/191,992, filed Mar. 29, 2023, entitled "FLEXIBLE AND SCALABLE ARTIFICIAL INTELLIGENCE AND ANALYTICS PLATFORM WITH FLEXIBLE CONTENT STORAGE AND RETRIEVAL," issued as U.S. Pat. No. 12,020,087, which is a continuation of, and claims a benefit of priority under 35 U.S.C. 120 from, U.S. patent application Ser. No. 17/324,200, filed May 19, 2021, entitled "FLEXIBLE AND SCALABLE ARTIFICIAL INTELLIGENCE AND ANALYTICS PLATFORM WITH FLEXIBLE CONTENT STORAGE AND RETRIEVAL," issued as U.S. Pat. No. 11,650,861, which is a continuation of, and claims a benefit of priority under 35 U.S.C. 120 from, U.S. patent application Ser. No. 16/295,379, filed Mar. 7, 2019, entitled "FLEXIBLE AND SCALABLE ARTIFICIAL INTELLIGENCE AND ANALYTICS PLATFORM WITH FLEXIBLE CONTENT STORAGE AND RETRIEVAL," issued as U.S. Pat. No. 11,023,293, which claims a benefit of priority under 35 U.S.C. § 119 (e) from the filing date of U.S. Provisional Application No. 62/639,899, filed Mar. 7, 2018, entitled "FLEXIBLE AND SCALABLE ARTIFICIAL INTELLIGENCE AND ANALYTICS PLATFORM WITH ADVANCED CONTENT ANALYTICS AND DATA INGESTION," the entire disclosure of which is fully incorporated by reference herein for all purposes.

TECHNICAL FIELD

This disclosure relates generally to content analytics and more particularly to systems, methods, and computer program products for a flexible and scalable artificial intelligence and analytics platform that provides alternate content storage mechanisms that are accessible by a client through the same API.

BACKGROUND OF THE RELATED ART

Today's enterprises are continuously bombarded with massive amounts of data (e.g., unstructured digital content) from disparate sources. In many scenarios, real-time responses and data solutions are needed to make sense and make use of such content. Accordingly, enterprises today generally rely on technologies to process, understand, and utilize enterprise content. Content analytics is one such technology.

Content analytics refers to the act of applying business intelligence (BI) and business analytics (BA) practices to digital content. Enterprises use content analytics software to gain insight and provide visibility into the amount of enterprise content that is being created, the nature of that content, and how it is used, for instance, in an enterprise computing environment.

Content analytics software such as OpenText™ Content Analytics, which is available from Open Text, headquartered in Canada, as part of the Open Text Information Access Platform, can provide many benefits, including creating machine-readable content from unstructured content, extracting meaningful and/or relevant content from the unstructured content, discovering valuable factual information from the unstructured content, increasing productivity by significantly reducing the time required to identify what content should be kept (e.g., for compliance reasons, which can also reduce legal risk), and so on.

While existing content analytics systems can be quite powerful and useful in many applications, it may be difficult to increase the scale of the data that is handled while maintaining performance. In other words, if a system uses one type of content storage mechanism (e.g., an in-memory database, or IMDB), performance is improved, but the amount of data that can be handled is limited. With other types of content storage mechanisms (e.g., a distributed cluster-computing framework), the amount of data that can be handled is increased, but this is achieved at the expense of performance. Additionally, these different types of data storage use very different mechanisms to access the stored data, using the different types of data storage may require adaptation of user interfaces to work with different APIs for the different data storage mechanisms. It would be desirable to provide a mechanism for content storage that overcomes these problems relating to performance, data capacity, scalability and ease of access.

SUMMARY OF THE DISCLOSURE

Embodiments disclosed herein provide innovations and improvements in the field of content analytics, wherein content can be stored in different types of repositories that implement very different technologies. In one embodiment, a content analytics system incorporates both an IMDB storage mechanism, such as a FastDB columnar database, and a distributed cluster-computing framework storage mechanism, such as a Spark cluster-computing framework. A user device interacts with a frontend user interface (UI) to communicate data requests to a custom API. The custom API can selectively convey the requests, either to an IMDB, or to a gateway for access to a distributed cluster-computing framework. If a request is directed to the IMDB, the request received by the custom API will be used to query the IMDB. A response to the request is generated and returned to the IMDB API, which forwards the response to the user device. If a request is directed to the distributed cluster-computing framework, the custom API will forward the request to the gateway for the distributed cluster-computing framework. The gateway will parse the request and use the parsed components to generate a set of instructions that will be executed through the distributed cluster-computing framework. A response is returned by the distributed cluster-computing framework to the gateway, which parses the response and uses the parsed components to generate a second response which is equivalent to the response that would have been returned from the IMDB. This second response generated by the gateway is forwarded to the IMDB API. The IMDB API then forwards this response to the user device. Thus, the user device operates as if it is interacting only with the IMDB system, whether the request is served by the IMDB or the distributed cluster-computing framework. Through appropriate selection of these alternative data storage mechanisms, the system may provide both the higher performance of the IMDB and the greater scalability and capacity of the distributed cluster-computing framework.

One embodiment comprises a content management system having one or more processors executing an advanced analytics system. A first data store is communicatively coupled to the advanced analytics system, wherein the first data store comprises a first database. A second data store is also communicatively coupled to the advanced analytics system, wherein the second data store comprises a second database that is distributed across a plurality of physically separate data storage devices that are interconnected with the advanced analytics system by one or more networks. The advanced analytics system includes a user interface that is coupled to a first database application program interface (API). In a first mode, the first database API is adapted to receive a first request for data from the UI, where the request is configured to query the first database. The first database API forwards the received first request to the first database and receives a response from the first database, which is then forwarded to the UI. In a second mode, the first database API is adapted to receive the first request for data from the UI, but instead of forwarding it to the first database, the API generates a second request is forwarded to a gateway for the second database, where the second request is configured to query the second database via an API for the second database. (The first request is not configured for the second database API.) The gateway is adapted to access the API, generating instructions to retrieve the desired data from the second database. The gateway receives a response from the second database API which is forwarded to the first API. Because this response is not configured in the same manner as a response from the first database API itself, the first API generates a second response which appears to be the same as if the first API had been used to access the first database. This second response is forwarded to the UI.

In one embodiment, the first database comprises an in-memory database, such as a FastDB columnar database. The second database may comprise a distributed cluster-computing framework such as a Spark framework. In one embodiment, the gateway is adapted to parse the second request, identify a processing class corresponding to the second request, and instantiate a processor from the identified processing class to handle the processing of the received request. The instantiated processor may retrieve datasets from the distributed cluster-computing framework, where the datasets correspond to tables involved in the first request. The processor may then join the retrieved datasets, select fields identified in the first request, and apply filters over the joined datasets to produce the first response. In one embodiment, a user may manually select either the first mode, in which the first API forwards received requests to the first database, or the second mode, in which requests are forwarded to the gateway to be processed and serviced by the second database. The first or second mode may alternatively be selected automatically by the first API based on conditions or characteristics of the first request, such as the amount of data involved in the servicing of the request.

An alternative embodiment comprises a method for servicing requests for data in an enterprise data processing environment having an IMDB API for accessing an IMDB and a distributed cluster-computing framework API for accessing a distributed cluster-computing framework, where a gateway is communicatively coupled between the IMDB API and the distributed cluster-computing framework API. The method includes receiving an initial request for data from a client, wherein the initial request is configured for an IMDB API, providing the initial request to a custom API, and determining whether the request will be serviced by an IMDB or a distributed cluster-computing framework. The method further includes, in response to determining that the initial request will be serviced by the IMDB, the custom API forwarding the initial request to the IMDB, receiving a response to the initial request from the, and forwarding the response from the responsive to the initial request. Alternatively, in response to determining that the initial request will be serviced by the distributed cluster-computing framework, the custom API will forward generate a modified request and send it to a gateway corresponding to the distributed cluster-computing framework. The gateway will then parse the modified request and generate instructions to be executed by the distributed cluster-computing framework to query this framework. The gateway receives a response from the distributed cluster-computing framework and returns the response to the custom API, which generates a modified response that appears the same as if the first API had been used to access the first database. This modified response is forwarded to the client.

Another alternative embodiment comprises a computer program product having a non-transitory computer-readable storage medium that stores computer instructions executable by a processor to perform a method substantially as described above. Numerous other embodiments are also possible.

The embodiments disclosed herein may provide solutions to one or more of the problems found in the prior art. For instance, the present embodiments provide scalability that enables the system to handle big data through the use of a distributed cluster-computing framework, while still allowing the use of a higher-performance IMDB when working with smaller data sets. Further, the present embodiments do not require clients to be adapted to interact with multiple APIs corresponding to the multiple types of data storage (e.g., IMDB and distributed cluster-computing framework), but instead allow clients to submit requests that are configured for a single API (e.g., the IMDB API). This API determines which type of data storage will service the request and either queries the corresponding database, or forwards the request to a gateway that generates corresponding requests for the distributed cluster-computing framework. Similarly, responses from the distributed cluster-computing framework are reconfigured to the form of the IMDB API's responses so that the client only has to be configured to handle tis single type of response. Still other advantages will be apparent to those skilled in the art.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

One object of some embodiments herein is to provide a technical solution to the scalability and performance problems described above. Another object of some embodiments is to provide a technical solution to the problem of easily accessing different types of data storage. Solutions may be provided in a system in which a modified API for an IMDB determines whether a client request should be serviced by the corresponding IMDB, or a distributed cluster-computing framework. In the former case, the client request is serviced by the IMDB API accessing the IMDB in a conventional manner. In the latter case, the client request is serviced by the IMDB API forwarding the request to a gateway for the distributed cluster-computing framework, which generates a new request based on the initial client request and then accesses the distributed cluster-computing framework using this second request. The response from the distributed cluster-computing framework is then used as the basis for generating a second response which is equivalent to a response provided by the IMDB. This second response is forwarded by the gateway to the IMDB API, which returns it to the client.

These features may be provided in a system that delivers artificial intelligence (AI), machine learning, data discovery, task automation, business optimization, and sophisticated dashboarding that enables enterprises to make smart and speedy decisions with their data. In some embodiments, this system may include a flexible and scalable AI and analytics platform ("platform") with advanced content analytics, data ingestion, and reporting/sharing functions. The platform, which includes hardware and software, may combine machine learning (ML), advanced analytics, enterprise-grade BI, and capabilities to acquire, merge, manage, and analyze structured and unstructured big data, including big content stored in Enterprise Information Management (EIM) systems. The platform enables machine-assisted decision making, automation, and business optimization.

Figure 1:
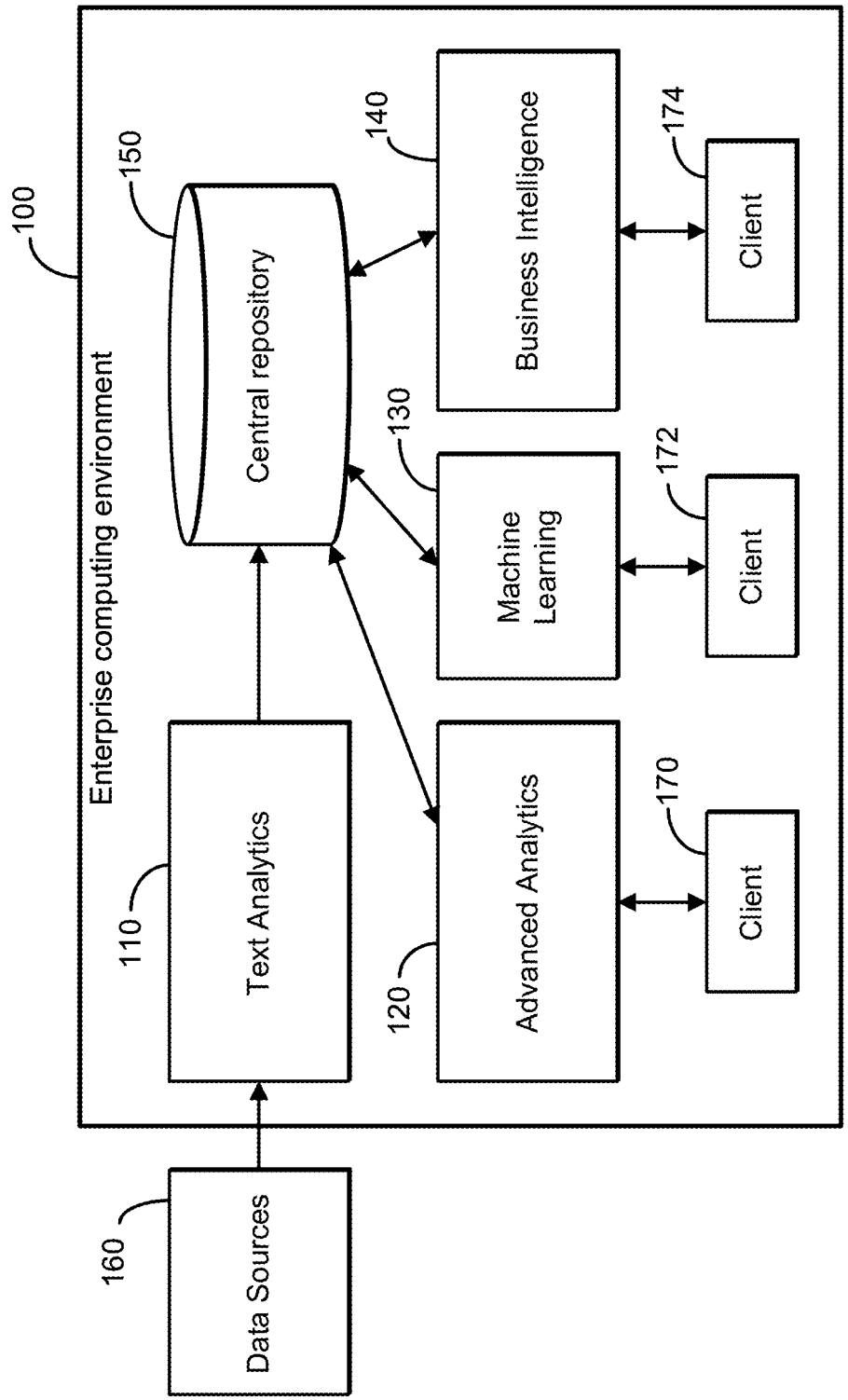
FIG. 1 depicts a diagrammatical representation of an enterprise computing environment according to some embodiments.

In some embodiments, as illustrated in FIG. 1, the platform operates in an enterprise computing environment. The enterprise computing environment 100 may include a text analytics system 110, an advanced analytics system 120, a developer platform 130 for data scientists (also referred to as a "Machine Learning Designer") and a business intelligence system 140. The text analytics system in this embodiment is communicatively connected to a variety of disparate data sources 160, including those that are external to the enterprise computing environment and those that are internal to the enterprise computing environment (not separately shown here). The text analytics system may, for instance, be communicatively connected to social media application data source(s), website data sources(s), and an enterprise repositories fileshare. Examples of social media applications include Twitter, Facebook, Linkedin, etc. Website data sources can include any web server hosting a website on the Internet. Examples of an enterprise content source can include an EIM system, a content server, an enterprise content management (ECM), etc. Other sources of data may also be possible (e.g., Internet of Things (IoT) devices).

The text analytics system 110 of the platform may include a data crawler configured for communicating with social media server(s) through a REST application programming interface (API) layer to obtain and/or receive unstructured social media content. This can include posts, comments, likes, images, links, or any content (whether it is automatically generated content or user generated content) that can be crawled from a social media application data source. Output from the data crawler is considered unstructured social media content which can be in disparate formats.

The text analytics system 110 of the platform may also include a web crawler configured for communicating with website server(s) through the REST API layer to obtain and/or receive unstructured web content from the Internet. Other crawlers are also possible and can be readily added (e.g., by adding a plug-in particular to the data type such as transcribed voice data) to the text analytics system, making the platform flexible and extensive with regard to data sources and types and not limited to social media or websites on the Internet.

The unstructured content (from various input sources and in different formats) may be provided to a data ingestion pipeline for processing, content extraction, content analyzing, and tagging. In some embodiments, the data ingestion pipeline processes text data separately and differently from numerical information. For example, meaning or sentiment may be extracted or derived from text data (e.g., a text string of 140 characters or less), while an approximation numerical analysis may be performed on numerical information. The data ingestion pipeline decomposes input data of various types from various data sources into a single common data model that is persisted in a central repository 150. The central repository is accessible by systems and/or services running on the platform, including the advanced analytics system 120, machine learning system 130, and business intelligence system 140 as shown in FIG. 1. The central repository may also accessible by other systems and/or services, such as a comprehensive query and reporting system and a directory service (e.g., OpenText Directory Service). Clients (e.g., 170, 172, 174) can access advanced analytics system 120, machine learning system 130, and business intelligence system 140 and can access central repository through them.

The advanced analytics system includes a frontend user interface (UI) configured for end users, an administrative UI configured for system administrators, visual data mining and predictive analysis applications, and APIs (not shown) for the UIs and applications (e.g., web service APIs for delivering analytics software as web services, REST APIs for the UIs, etc.). Additionally, the advanced analytics system includes an IMDb API with algorithms for accessing unstructured and structured data persisted in databases (e.g., proprietary FastDB columnar databases) in the central repository. The advanced analytics system further incudes a gateway to a distributed cluster-computing framework such as Apache Spark. Apache Spark requires a cluster manager and a distributed storage system. In one embodiment, Apache Hadoop software framework is used for distributed storage and processing of datasets of big data. Skilled artisans appreciate that "big data" refers to data sets that are so voluminous and complex (and sometimes that grow rapidly) that traditional data processing software is inadequate to process them. In order to have certain big data analytics features (which will not run on the Spark (Parquet) database format) run on the datasets, the datasets may first be translated from the Parquet database format to a proprietary columnar database format.

Conventional IMDBs could not scale to allow processing of large amounts of data (e.g., hundreds or more gigabytes of data), so a new platform is provided. Architecturally, the platform disclosed herein combines big data analytics (BDA), data ingestion pipeline, information management and dashboarding, and a developer platform in a comprehensive, intelligent, and seamless manner. The present enterprise computing environment includes both an IMDB that is persisted in a locally accessible memory (e.g., a FastDB columnar database which runs in the main memory of a host), and a distributed data framework that is persisted across multiple, typically networked data stores (e.g., a Spark distributed data framework), in order to obtain some of the advantages of both of these types of data storage. In one embodiment, the platform utilizes Hadoop and Spark to scale to larger data sets and perform analytics. The platform also adds a Notebook paradigm, which approximates a developer platform for data scientists.

Examples of the IMDB which are described herein include a FastDB columnar database, although it should be noted that other IMDBs may be employed in alternative embodiments. A column-oriented or columnar database management system stores data tables by column. Practical use of a column-oriented is very similar to the use of a row-oriented database, and both can use traditional database query languages (e.g., SQL or the like) to load data and perform queries. Both row and columnar databases are commonly used in extract, transform, load (ETL) and data visualization tools. These databases may provide very high performance when they reside in the main memory of the host. The use of columnar databases in particular may improve performance under certain workloads because these databases can, in these cases, more precisely access the data needed to answer queries than row-oriented databases which must scan and discard rows of data that are not wanted.

Although IMDBs may be well suited for online analytical processing workloads, there are limits to the amounts of data that they can handle. In particular, they may be insufficient to handle big data. The present enterprise computing environment therefore also utilizes a distributed cluster-computing framework. In the examples below, a Spark distributed cluster-computing framework is used, but other frameworks may be implemented in other embodiments. Spark uses a resilient distributed dataset architecture which has a set of data items distributed over a cluster of machines. Spark offers fault tolerance and virtually unlimited capacity, so it can be used for analytics involving big data. While Spark can handle the vast amounts of data involved in big data analytics, its performance may suffer as a result of network latencies when accessing the data stored in the Spark cluster. It may therefore be desirable in some scenarios, such as when a data scientist wishes to perform a number of queries or analyses on a subset of the data stored in the Spark framework, to retrieve a portion of the data that from the Spark framework to the FastDB columnar database in order to perform the queries or analyses on the subset of the data with higher performance.

As described above, ingested data (which is persisted in the central repository according to the single data model) is accessible for consumption by both the advanced analytics system and the comprehensive query and reporting system. In turn, these systems can also input numerical data that comes through them into the single data model. More specifically, the comprehensive query and reporting system can perform traditional BI analytics and the advanced analytics system can perform advance modeling. Numerical outputs from the analytics can be inserted by these systems into the single data model and persisted in the central repository. Further, the platform includes an improved gateway to a reliable and robust cluster-computing framework. The gateway provides fast and efficient access to the extraordinarily large data set (e.g., hundreds and hundreds of gigabyte of data) that is stored in the cluster-based data framework while allowing the client to use the same queries that are used for the local (e.g., memory-based) database.

As noted above, although the embodiments described in detail below use a FastDB columnar database as the IMDB, and use a Spark framework as the distributed cluster-computing framework, other embodiments may use other databases and distributed frameworks. References below to FastDB and Spark should therefore be broadly construed to cover these other databases and distributed frameworks, rather than being regarded as limiting.

In one embodiment, the advanced analytics system of the enterprise computing environment includes an API associated with the IMDB (e.g., a FastDB API) that can be accessed by a client to interact with the IMDB (e.g., a FastDB columnar database). In a first mode, the client accesses the FastDB API normally, with the API receiving a request from the client and forwarding the request to the FastDB database using FastDB API objects. Data responsive to the request is retrieved from the FastDB database and is returned by the FastDB API to the client.

In a second mode, the FastDB API receives a request and, instead of accessing the FastDB database, the FastDB API generates a second request which is based on the FastDB request that would have been used to access the FastDB database, but is configured to access the Spark framework. The new request is forwarded to a gateway to the cluster-based data framework (e.g., a Spark framework). The Spark gateway parses the second request and generates instructions to be executed through the distributed cluster-computing framework. The instructions are executed to access the data in the Spark framework (which may be referred to as a data lake). After data responsive to the request is received by the gateway, the response is forwarded to the FastDB API. The FastDB API generates a second response, which is configured as if the request had been serviced by the FastDB columnar database, and this second response is returned to the client.

In this system, the client accesses the FastDB API in the same way, regardless of whether the request will be serviced in the first mode or the second mode. Consequently, the client does not have to be concerned with the details of how the Spark data framework is accessed, but only has to be able to access the FastDB API. Similarly, the client does not have to be able to understand how data is served by the Spark data framework, but only has to be able to handle data as it is returned by the FastDB API.

It should be noted that, while FastDB is used herein as an example of a local database, it is intended to be exemplary, and other embodiments of the invention may be implemented with other types of local databases instead of a FastDB database. Similarly, the use of a Spark data framework in the exemplary embodiments described herein is intended to be illustrative, rather than limiting, and other types of cluster-based data storage frameworks may be implemented in alternative embodiments of the invention.

Figure 2:
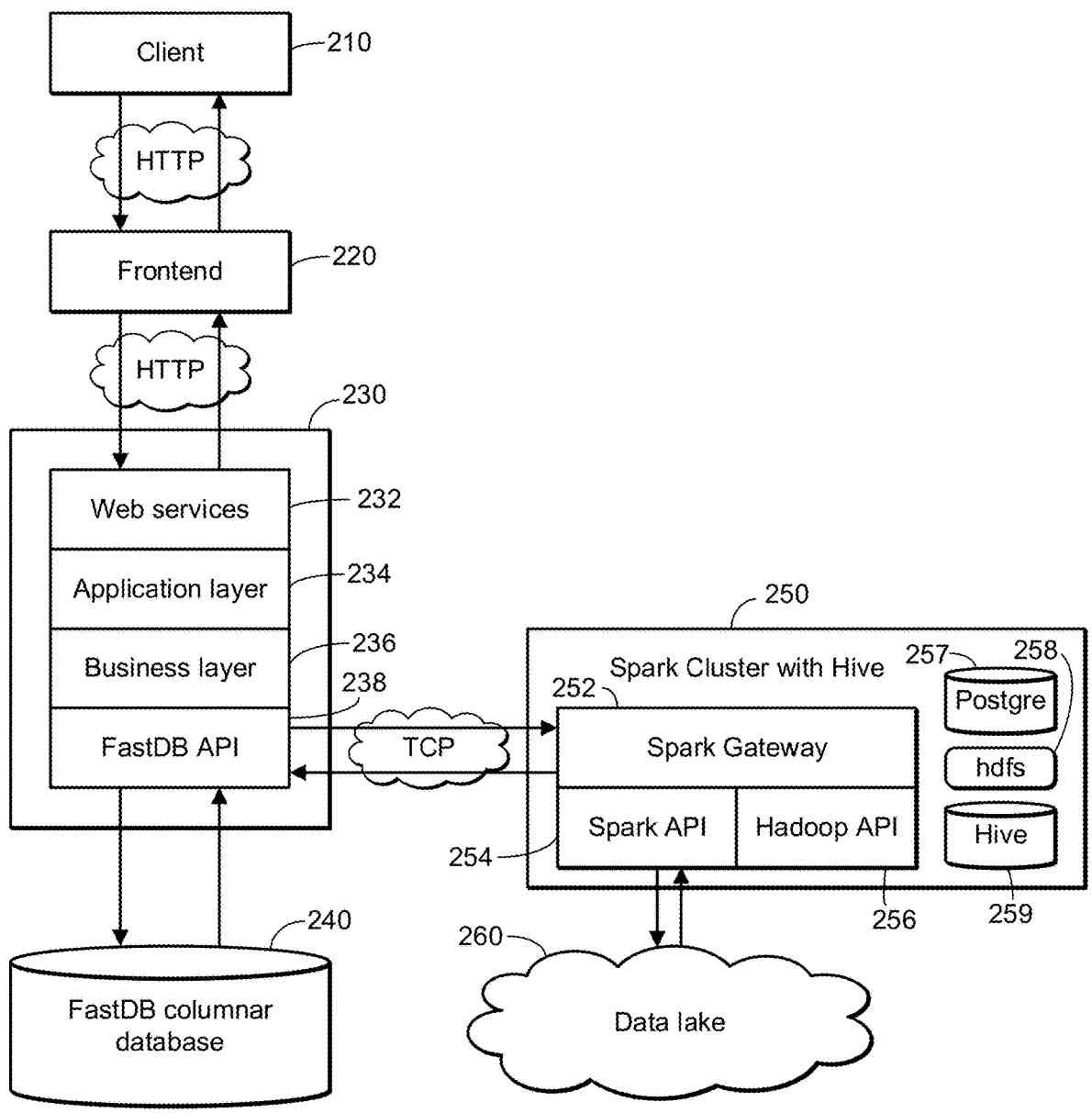
FIG. 2 depicts a diagrammatical representation of a portion of the advanced analytics system and data storage systems of the enterprise computing environment according to some embodiments.

Referring to FIG. 2, a diagrammatical representation of a portion of the advanced analytics system and data storage systems of the enterprise computing environment is shown. As depicted in this figure, a client is communicatively coupled to an advanced analytics application 230 via a frontend UI. Advanced analytics application 230 includes a web services layer 232, an application layer 234 and a business layer 236. Advanced analytics application 230 also includes a FastDB API 238 which is communicatively coupled to a FastDB columnar database.

Advanced analytics application 230 is also coupled to a Spark cluster 250 via FastDB API 238. In one mode, FastDB API 238 communicates with Spark gateway 252 as will be explained in more detail below. Spark Cluster 250 includes a Postgre database 257 which stores metadata for the tables stored in the Spark Cluster, a Hadoop distributed file system (HDFS) 258, a Hive database interface 259, a Hadoop API 256 and a Spark API 254. The dataset stored within Spark cluster 250 may be referred to a data lake 260.

Client 210 can access the data in FastDB database 240 and in data lake 260 through the FastDB API of advanced analytics application 230. The access can be made in a first mode, in which FastDB API 238 functions "normally", accessing the data in FastDB database 240. That is, the FastDB API receives client requests from frontend UI 220 and forwards the requests to FastDB columnar database 240, then the responses returned to the FastDB API from the FastDB database are forwarded through the frontend UI to the client. Alternatively, the client can access data in a second mode, in which FastDB API 238 generates a modified request and forwards the modified request to Spark gateway 252. This is necessary because the FastDB and Spark APIs and the respective data storage systems are substantially different, and the request configured to access the FastDB database through the FastDB API would not be operable to access the Spark dataset through the Spark API. The request forwarded by FastDB API 238 to Spark gateway 252 is configured to access data lake 260.

When Spark gateway 252 receives a modified request from FastDB API 238, it generates instructions to access data lake 260 via Spark API 254. When the Spark dataset is accessed, a response is returned to Spark API 254, which forwards the response to Spark gateway 252. This response is then forwarded to FastDB API 238. Since the response would not be recognized as the FastDB-configured response that the client's original request, FastDB API 238 generates a new response, based on the response received from Spark API 254. This new response is configured in the same manner as a response that would have been generated by FastDB database 240 if it had serviced the request. The response generated by FastDB API 238 is then forwarded to client 210 via frontend UI 220.

FastDB API 238 provides a mechanism for applications to execute instructions on FastDB database 240 or the Spark distributed cluster-computing framework without knowing the underlying XML messages. After the advanced analytics application has instantiated and populated properly the FastDB API's objects according to the query that must be executed, FastDB API 238 either uses these objects to query the FastDB columnar database, or serializes these objects to compose an XML instruction to be forwarded to Spark gateway 252. In a similar way, when FastDB API 238 gets the resulting response from the FastDB database 240, or from the Spark framework via the Spark gateway 252, it will generate instances of the classes extracting the data from the XML response, which will then be used by the advanced analytics application 230. The advanced analytics application processes the FastDB API objects that have been created from the response and generates its own XML format message that will be delivered to the client application 210 via the frontend UI 220.

The operation of the Spark gateway will be explained in more detail in connection with FIGS. 3A-3C, which are a set of flow diagrams illustrating an exemplary method for selecting access to either the FastDB database or the Spark framework and making the corresponding access.

Figure 3A:
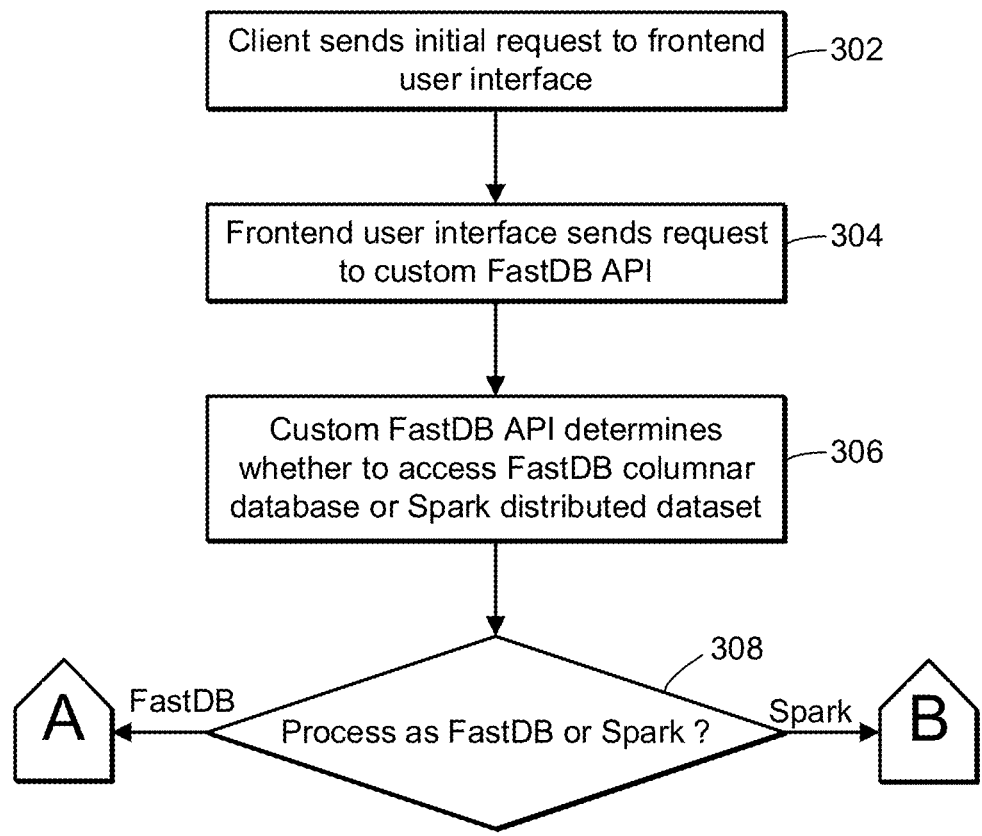
FIGS. 3A-3C depict flow diagrams illustrating an exemplary method for selecting access to either an IMDB or a distributed cluster-computing framework and making the corresponding access according to some embodiments.

Referring to FIG. 3A, the client sends an initial request to the frontend UI (302). The frontend UI then sends this request to the FastDB API of the advanced analytics application (304). The FastDB API determines whether a corresponding access should be made to the FastDB columnar database, or to the Spark distributed data set (306). This determination may be made in a number of ways. For example, in one embodiment, the user may manually select which of the data stores to be accessed before ever making the request. In other words, the user may simply choose to use one of the data stores or the other, and may select an appropriate setting (e.g., a flag or other indicator). Then, when the FastDB API receives the client request, it identifies this setting and forwards the request to the appropriate destination as determined from the setting. In an alternative embodiment, the determination of whether to access the FastDB database or the Spark distributed data set may be made automatically by the FastDB API when the client request is received. In this case, the determination may be based upon attributes or characteristics of the request itself. For instance, if the request involves an amount of data that is below a threshold, the FastDB API may proceed to access the FastDB database, which can often handle smaller data sets with greater performance. On the other hand, if the request involves an amount of data that is above the threshold, the FastDB API may access the Spark data set because the FastDB database may not be well suited to handle this larger amount of data. After the FastDB API as determined which data store should be accessed, the client request is forwarded and processed appropriately (i.e., according to FIG. 3B in the case of accesses to the FastDB database, or according to FIG. 3C in the case of accesses to the Spark data set).

Figure 3B:
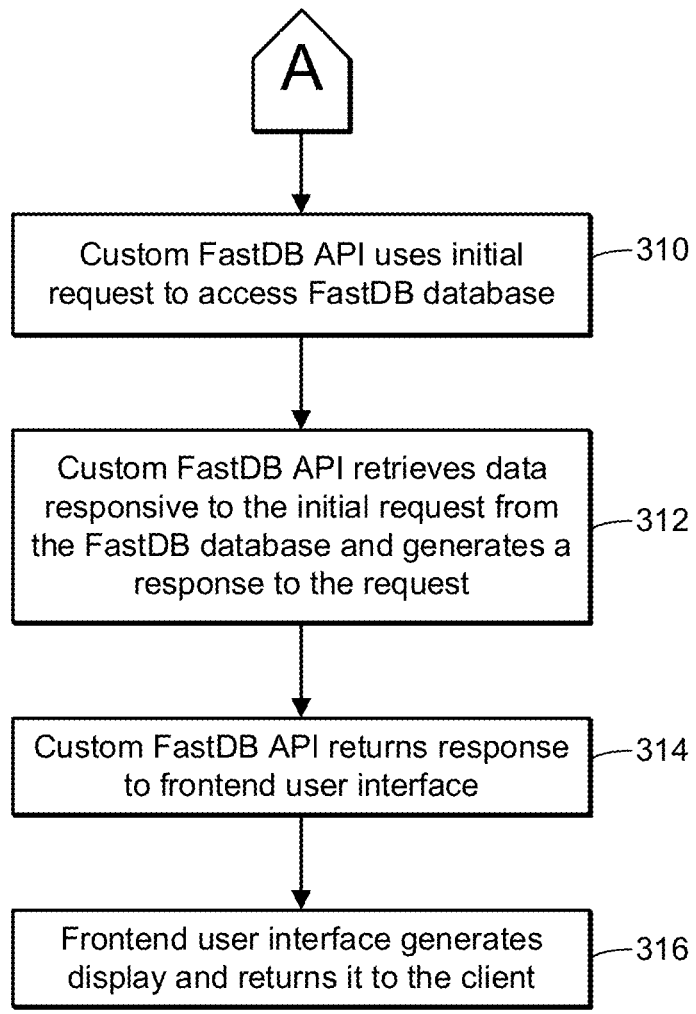

Referring to FIG. 3B, a flow diagram illustrating the processing of the client request to access the FastDB database (the first mode identified above) is shown. In this case, the modified FastDB API functions in the same manner as an ordinary FastDB API, using the initial request that is received from the front end UI to access the FastDB database using FastDB API objects (310). The FastDB API retrieves data responsive to the initial request from the FastDB database and generates a response to the initial request (312). The FastDB API then returns the generated response to the front end UI (314). The frontend UI then generates a display based on the response and returns the display to the client (316). As noted above, this process is the same as it would be using an ordinary FastDB API.

Figure 3C:
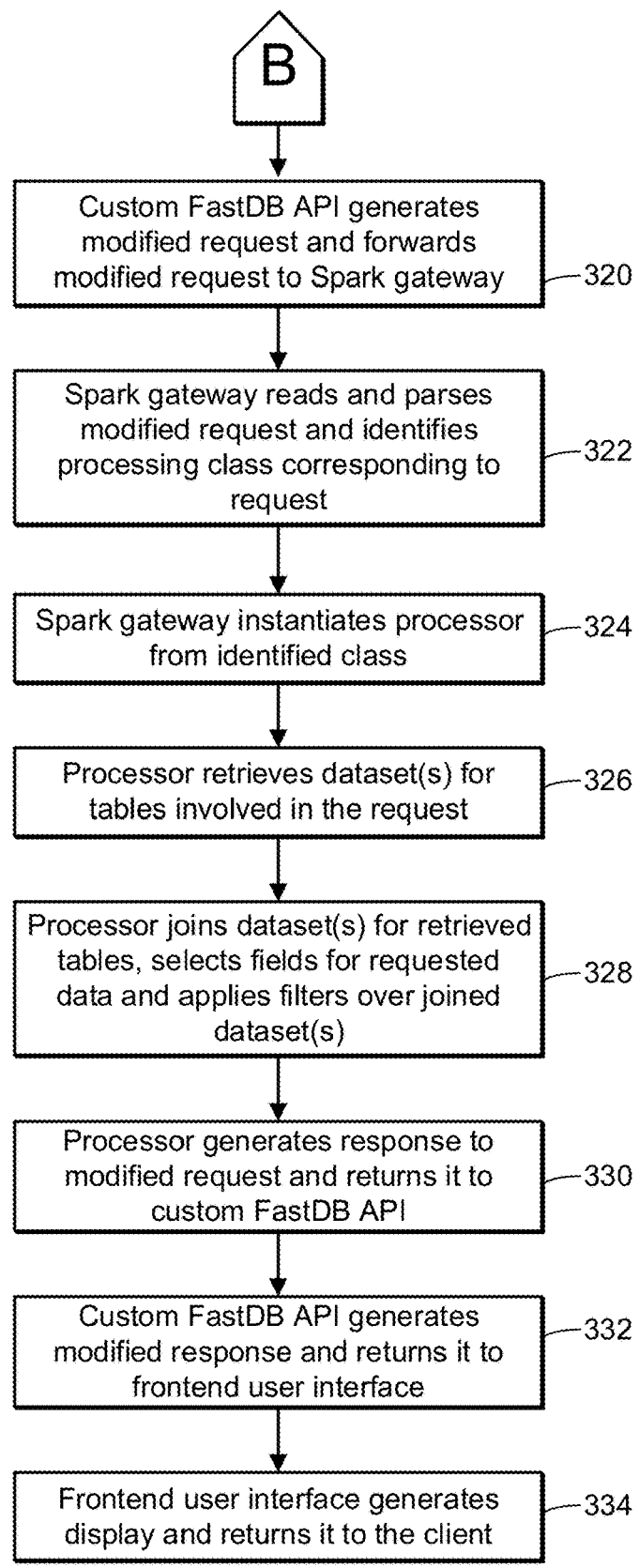

Referring to FIG. 3C, a flow diagram illustrating the processing of the client request to access the Spark data set (the second mode identified above) is shown. As noted above, this process is performed if the modified FastDB API determines that the client request should be serviced using the Spark data set rather than the FastDB database. When the FastDB API determines that the client request should be serviced using the Spark data set, the FastDB API generates a new request that is based on the client's original request but is adapted to access the Spark framework, and forwards this new request to the Spark gateway (320). The Spark gateway reads the received modified request, parses the request, and identifies a processing class corresponding to the request (322). Based upon the identified processing class, the Spark gateway instantiates a corresponding processor to handle the request (324). The instantiated processor then accesses the Spark data set to retrieve data for the tables that are involved in the request (326). The processor then joins the data sets for the retrieved tables, selects fields corresponding to the requested data, and applies filters over the joined data sets to produce the requested data (328), which is returned to the custom FastDB API (330). At this point, the responsive data is not configured so that it would be understandable as a response to the FastDB-oriented client request, so the custom FastDB API uses the responsive data to generate a FastDB-oriented response to the initial client request and returns this response to the front end UI (332), and the front end UI uses this response to generate a display that is returned to the client (334).

An example is provided below to illustrate the operation of the system in the second mode, as depicted in FIG. 3C. In this example, it is desired to retrieve data from two tables: Customer and Household. Each table has an underlying ORC file (in Optimized Row Columnar file format) and is registered in Hive Catalog. The metadata of the relationship between the Customer and Household tables is stored in PostgreSQL and is managed by the Spark gateway. The specific information that the user wishes to get from the tables is the first fifty customers that are identified in the tables as 'Directors' and 'Females'. The user requires that the response contain three fields: Country, County and Surname of the customer. The Spark gateway is the component that will retrieve data from the data lake, process this data and produce the results that will be provided to the user.

Below is the initial request that is sent to application web services from the frontend UI and will be forwarded to the FastDB API.

```
recordView>
    <nameex>[default].[customer]</nameex>
    1
    <pageSize>50</pageSize>
    <filter>
        <domainstore>
            <operationwithprevious>AND</operationwithprevious>
            <name>rootblock</name>
            <label>occupation EQ DI</label>
            <definition>
                <simplequery>
                    <name>rootblock</name>
                    <operationwithprevious>AND</operationwithprevious>
                    <count>8034</count>
                    <remain>8034</remain>
                    <column>[default].[customer].[occupation]</column>
                    <operator>EQ</operator>
                    <value>DI</value>
                </simplequery>
            <domainstore>
                <operationwithprevious>AND</operationwithprevious>
                <name>rootblock</name>
                <label>gender EQ F</label>
                <definition>
                    <simplequery>
                        <name>rootblock</name>
                        <operationwithprevious>AND</operationwithprevious>
                        <count>95947</count>
                        <remain>95947</remain>
                        <column>[default].[customer].[gender]</column>
                        <operator>EQ</operator>
                        <value>F</value>
                    </simplequery>
                </definition>
                <count>95947</count>
                <remain>877</remain>
                <resolutiontable>[default].[customer]</resolutiontable>
            </domainstore>
            </definition>
            <count>877</count>
            <remain>877</remain>
            <resolutiontable>[default].[customer]</resolutiontable>
        </domainstore>
    </filter>
    <template>
        <column>[default].[household].[country]</column>
        <column>[default].[household].[county]</column>
        <column>[default].[customer],[surname]</column>
    </template>
</recordView>
```

The advanced analytics application uses the custom FastDB API to generate a modified request for the Spark gateway. A TCP connection is established from the application to the Spark gateway and an XML message containing the modified request is sent to the Spark gateway via the TCP connection. The modified request is shown below.

```
<qcomm origin_app="Magellan Data Discovery" origin_username="Administrator">
    <operation>getrecordset</operation>
    <type>query</type>
    <definition>
        <recordset>
            <name>rootblock</name>
            <definition>
                <resolutiontable>[default].[customer]</resolutiontable>
                1
                <pagesize>50</pagesize>
                <template>
                    <name>template</name>
                    <definition>
                        <column>[default].[household].[country]</column>
                        <column>[default].[household].[county]</column>
                        <column>[default].[customer].[surname]</column>
                    </definition>
                </template>
                <domainstore>
                    <operationwithprevious>AND</operationwithprevious>
                    <name>rootblock</name>
                    <label>occupation EQ DI</label>
                    <definition>
                        <simplequery>
                            <name>rootblock</name>
                            <operationwithprevious>AND</operationwithprevious>
                            <column>[default].[customer].[occupation]</column>
```

```
            <operator>EQ</operator>
            <value>DI</value>
          </simplequery>
          <domainstore>
            <operationwithprevious>AND</operationwithprevious>
            <name>rootblock</name>
            <label>gender EQ F</label>
            <definition>
              <simplequery>
                <name>rootblock</name>
                <operationwithprevious>AND</operationwithprevious>
                <column>[default].[customer].[gender]</column>
                <operator>EQ</operator>
                <value>F</value>
              </simplequery>
            </definition>
            <resolutiontable>[default].[customer]</resolutiontable>
          </domainstore>
        </definition>
        <resolutiontable>[default].[customer]</resolutiontable>
      </domainstore>
    </definition>
  </recordset>
</definition>
</qcomm >
```

The Spark gateway reads the modified request received from the custom FastDB API and parses the request. The Spark gateway identifies the operation involved in the initial request and selects a processing class corresponding to the operation. In this example, the operation of the initial request is "getrecordset". The Spark gateway instantiates a processor from the selected processing class and the processor performs operations using Spark API objects that allow dataset manipulation to service the request.

The processor instantiated by the Spark gateway retrieves data sets for each of the involved tables from the Spark data lake. The instantiated processor joins the retrieved datasets of each table using the metainformation that is stored for the tables in the PostgreSQL database. The processor selects the fields that are required by the client request and applies filters over this joined dataset to obtain the desired information.

After the instantiated processor has completed the query of the Spark data lake to obtain the requested information, the response below is generated and, serialized as XML, is forwarded through the TCP socket to the FastDB API.

```
              <qresponse>
                <header>
                  0
                  <pagesize>50</pagesize>
                  <pages>18</pages>
                  <numcolumns>3</numcolumns>
                  <totalrows>877</totalrows>
                  <numrows>50</numrows>
                </header>
                <body>
                  <recordset>
                    <h>
                      <c>[default].[customer].[_uniqueid_]</c>
                      <c[default].[household].[country]</c>
                      <c>[default].[household].[county]</c>
                      <c>[default].[customer].[surname]</c>
                    </h>
                    <r>
                      <c>29</c>
                      <c></c>
                      <c></c>
                      <c>Benjeman</c>
                    </r>
```

-continued

```
                    <r>
                      <c>463</c>
                      <c>US</c>
                      <c>Los Angeles</c>
                      <c>Farnaby</c>
                    </r>
                    . . . suppressed rows . . .
                    <r>
                      <c>16907</c>
                      <c>US</c>
                      <c>Los Angeles</c>
                      <c>Hopwood-Robinson</c>
                    </r>
                  </recordset>
                </body>
              </qresponse>
```

If this response were simply forwarded from the FastDB API back to the frontend UI, the UI would not be able to correctly interpret the response because it expects a response that corresponds to the FastDB-oriented request that it forwarded to the FastDB API. Consequently, the custom FastDB API deserializes the XML response from the Spark gateway, creating the needed class instances that can be handled by the requesting application. The resulting modified response which is shown below is returned to the client application through the frontend UI.

```
              <result r='877' p='18' co='4'>
                <r>
                  <t v='[default].[customer].[_uniqueid_]' type='7'></t>
                  <t v='[default].[household].[country]' type='6'></t>
                  <t v='[default].[household].[county]' type='6'></t>
                  <t v='[default].[customer].[surname]' type='6'></t>
                </r>
                <r>
                  <c v='29'></c>
                  <c v=''></c>
                  <c v=''></c>
                  <c v='Benjeman'></c>
                </r>
                <r>
                  <c v='463'></c>
                  <c v='US'></c>
```

```
        <c v='Los Angeles'></c>
        <c v='Farnaby'></c>
     </r>
  ... suppressed rows ...
     <r>
        <c v='16170'></c>
        <c v='US'></c>
        <c v='Alameda'></c>
        <c v='Hevicon'></c>
     </r>
     <r>
        <c v='16907'></c>
        <c v='US'></c>
        <c v='Los Angeles'></c>
        <c v='Hopwood-Robinson'></c>
     </r>
  </result>
```

In this example, the advanced analytics application is executing the queries against the Spark gateway, but the flow using the FastDB API would be the same, because the FastDB API isolates the application layer from the underlying analytical engine-Spark or FastDB.

The foregoing description is directed primarily to a method embodiment. An alternative embodiment comprises a system having a processor and a non-transitory computer-readable storage medium that stores computer instructions executable by the processor to perform a method substantially as described above. Another embodiment comprises a computer program product having a non-transitory computer-readable storage medium that stores computer instructions executable by a processor to perform a method substantially as described above. Numerous other embodiments are also possible.

Embodiments discussed herein can be implemented in a computer communicatively coupled to a network (for example, the Internet), another computer, or in a stand-alone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like. In embodiments of the invention, the computer has access to at least one database over the network.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nanoengineered systems, components and mechanisms may be used. The functions of the invention can be achieved by distributed or networked systems. Communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein, the meaning of "in" includes "in" and "on" unless the context clearly dictates otherwise.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted. The scope of the disclosure should be determined by the following claims and their legal equivalents.

What is claimed is:

1. A content management system comprising:
one or more processors executing an analytics system;
a memory coupled to the analytics system, the memory storing an in-memory database (IMDB);
wherein the analytics system receives a data request and determines whether to process the data request for the IMDB or for a distributed database;
wherein if the analytics system determines to process the data request for the IMDB, the analytics system:
queries the IMDB; and
receives a corresponding IMDB response from the IMDB;
wherein if the analytics system determines to process the data request for the distributed database, the analytics system:
generates a query request corresponding to the data request wherein the query request is configured to query the distributed database;
forwards the query request to the distributed database; and
receives a corresponding distributed database response from the distributed database;
wherein the corresponding distributed database response is modified as if it had been received from the IMDB.

2. The content management system of claim 1, wherein the analytics system includes a frontend user interface which is adapted to:
receive the data request from a client;
forward the data request;
receive either the response or the modified response; and
return the response or the modified response to the client.

3. The content management system of claim 1, wherein the analytics system is configured to communicate with the distributed database via a TCP socket in a serialized XML format.

4. The content management system of claim 1, wherein the analytics system is configured to generate the query request by translating the data request from a first format adapted to the IMDB to a second format adapted to the distributed database.

5. The content management system of claim 4, wherein the analytics system is configured to generate the modified response by translating the request from the second format to the first format.

6. The content management system of claim 4, wherein the system is adapted to parse the query request, identify a processing class corresponding to the query request, generate a processor from the identified processing class, retrieve from the distributed database datasets corresponding to tables involved in the query request, join the retrieved datasets, select fields identified in the query request, and apply filters over the joined datasets to produce the first response.

7. The content management system of claim 1, wherein the content management system is configured to enable a user to manually select whether to process the data request for the IMDB or the distributed database.

8. The content management system of claim 1, wherein the content management system is configured to determine whether to process the data request for the IMDB or the distributed database in response to identifying one or more conditions or characteristics of the data request.

9. The content management system of claim 8, wherein the one or more conditions or characteristics of the data request includes an amount of data associated with the first request.

10. A method for servicing requests for data by an analytics system, the method comprising:
receiving, by the analytics system, a data request;
determining whether to process the data request for an in-memory database (IMDB) or a distributed database;
wherein if the analytics system determines to process the data request for the IMDB:
querying, by the analytics system, the IMDB; and
receiving, by the analytics system, a corresponding IMDB response from the IMDB;
wherein if the analytics system determines to process the data request for the distributed database:
generating, by the analytics system, a query request corresponding to the data request wherein the query request is configured to query the distributed database;
forwarding, by the analytics system, the query request to the distributed database; and
receiving a corresponding distributed database response from the distributed database;
wherein the corresponding distributed database response is modified as if it had been received from the IMDB.

11. The method of claim 10, further comprising:
receiving, by a frontend interface, the data request from a client;
forwarding, by the frontend interface, the data request;
receiving either the response or the modified response; and
returning the response or the modified response to the client.

12. The method of claim 10, further comprising parsing the data request, identifying a processing class corresponding to the data request, instantiating a processor from the identified processing class, and the instantiated processor generating the query request using information parsed from the data request.

13. The method of claim 10, wherein the analytics system is configured to communicate with the distributed database via a TCP socket in a serialized XML format.

14. The method of claim 10, wherein the analytics system generating the modified response comprises: parsing the database response and generating the modified response using information parsed from the database response, wherein the modified response is configured as an IMDB response.

15. The method of claim 10, wherein the analytics system is configured to enable a user to manually select whether to process the data request for the IMDB or the distributed database.

16. The method of claim 10, wherein the content management system is configured to determine whether to process the data request for the IMDB or the distributed database in response to identifying one or more conditions or characteristics of the data request.

17. A computer program product for servicing requests for data in an enterprise data processing environment, the computer program product comprising a non-transitory computer-readable medium storing instructions executable by a one or more processors to cause the one or more processors to perform:
executing an analytics system;
receiving, by the analytics system, a data request;
determining whether to process the data request for an in-memory database (IMDB) or a distributed database;
wherein if the analytics system determines to process the data request for the IMDB:
querying, by the analytics system, the IMDB; and
receiving, by the analytics system, a corresponding IMDB response from the IMDB;
wherein if the analytics system determines to process the data request for the distributed database:
generating, by the analytics system, a query request corresponding to the data request wherein the query request is configured to query the distributed database;
forwarding, by the analytics system, the query request to the distributed database; and
receiving a corresponding distributed database response from the distributed database;
wherein the corresponding distributed database response is modified as if it had been received from the IMDB.

18. The computer program product of claim 17, further comprising parsing the data request, identifying a processing class corresponding to the data request, instantiating a processor from the identified processing class, and the instantiated processor generating the query request using information parsed from the data request.

19. The computer program product of claim 17, wherein the analytics system is configured to communicate with the distributed database via a TCP socket in a serialized XML format.

20. The computer program product of claim 17, wherein the content management system is configured to determine whether to process the data request for the IMDB or the distributed database in response to identifying one or more conditions or characteristics of the data request.

* * * * *